United States Patent [19]

Kurumaji et al.

[11] Patent Number: 4,504,208

[45] Date of Patent: Mar. 12, 1985

[54] MOLD CLAMPING DEVICE FOR INJECTION MOLDING MACHINE

[75] Inventors: Masanobu Kurumaji; Naoki Takeuchi; Hiroaki Kondo, all of Kobe; Toshiaki Akita, Amagasaki; Tsutomu Sano; Katsumi Sugano, both of Kobe, all of Japan

[73] Assignee: Kabushiki Kaisha Kobe Seiko Sho, Kobe, Japan

[21] Appl. No.: 513,387

[22] Filed: Jul. 13, 1983

[30] Foreign Application Priority Data

Jul. 14, 1982 [JP] Japan .................................. 57-123514
Oct. 1, 1982 [JP] Japan .................................. 57-173783
Oct. 1, 1982 [JP] Japan .................................. 57-173782

[51] Int. Cl.³ .............................................. B29F 1/00
[52] U.S. Cl. ................................. 425/589; 425/450.1; 425/595
[58] Field of Search ................. 425/589, 595, 450.1, 425/451.9

[56] References Cited

U.S. PATENT DOCUMENTS 3,587,138  6/1971  Bammert ............................. 425/595
3,729,283  4/1973  Eggenberger et al. ............. 425/589
4,021,181  5/1977  Hehl ..................................... 425/589

FOREIGN PATENT DOCUMENTS

2295832  8/1976  France ................................. 425/595

*Primary Examiner*—Donald Czaja
*Assistant Examiner*—V. Fischbach
*Attorney, Agent, or Firm*—Oblon, Fisher, Spivak, McClelland & Maier

[57] ABSTRACT

A mold clamping device for an injection molding machine wherein a movable table which supports a movable mold is moved in directions approaching and moving away from a fixed table which supports a fixed mold to thereby bring the molds into open and closed states, and wherein mold clamping is effected in a closed state of the molds by mold clamping cylinders. The mold clamping device includes tie rods for guiding the movement of the movable table, the tie rods projecting upward from the fixed table and being each provided with an engaging groove such as threads or the like formed on the outer peripheral surface of its portion projecting from the movable table to the side opposite to the fixed table in the closed state of the molds; and split mold-like locking members capable of engaging with and disengaging from the tie rods each through each engaging groove in the closed state of the molds, the locking members being slidable in the axial direction of the tie rods. The mold clamping cylinders are disposed between the locking members and the movable table. Since the tie rods which receive the mold clamping reaction are so constructed as to also be employable as guide members for guiding the movement of the movable table, it is possible to attain a structural simplification and reduction in size in addition to advantage in terms of maintenance.

7 Claims, 17 Drawing Figures

MOLD CLAMPING DEVICE FOR INJECTION MOLDING MACHINE

BACKGROUND OF THE INVENTION

1. Field of the Invention

The present invention relates to a mold clamping device for an injection molding machine and, more particularly, to a so-called double cylinder type mold clamping device which performs mold opening and closing and mold clamping by separate cylinders.

2. Description of the Prior Art

As already known, the applicant in the present case has previously proposed a double cylinder type mold clamping device for an injection molding machine in which a slide platen (hereinafter referred to simply as "slide") which supports a movable mold is advanced toward and retracted from a molding machine base (hereinafter referred to simply as "base") which supports a fixed mold, through generally four tie rods and mold opening/closing cylinders each of which are fixed to the base, thereby performing opening and closing of both molds and also performing mold clamping in a closed state of both molds, and in which, in order to attain a reduction in size of the cylinders and a structural simplification by eliminating the oil filling valve, an engaging portion such as a groove-toothed face or the like is formed on the outer peripheral surface on the tie rod, and an opening/closing split mold-like locking member which is disengageably engageable with the said engaging portion is slidably mounted on the tie rod, the tie rod serving as a receiving member for mold clamping reaction, and with a mold clamping cylinder being mounted between the locking member and the slide. In the fitting structure between the slide and the tie rods on which the slide slides in such type of a mold clamping device, a long and large guide bush structure has heretofore been provided on the inner surface of the tie rod sliding bore of the slide in order to prevent knocking when the slide moves and which passes the engaging portion such as a groove-like toothed surface or a threaded groove formed on the outer peripheral surface of the tie rod. As a result, not only is the bush structure complicated and larger in size, but also the inside of the tie rod is narrower. Moreover, in the case of a utilizing a bushing, the occurrence wear is a reoccurring problem.

In such type of mold clamping device, moreover, as means for engaging the locking member with the engaging portion and locking it onto the tie rod, there has typically been adopted means for predetermining the size (thickness) of the mold used, or means for determining such on the basis of detection of the engaging portion, e.g. a groove-like toothed surface, of the tie rod by means of a detector. However, the aforementioned sizing means has the drawback that the mold size (thickness) is restricted, and the latter detector means leaves something to be desired with respect to reliability and durability because of frequent daily operations no matter whether the detection is accomplished electrically, magnetically or optically. Further, since the locking members on, say, four tie rods are each driven individually, the structure of the clamping device and that of the detector are more complicated.

SUMMARY OF THE INVENTION

In view of the above-mentioned problems associated with the prior art, the present invention has as its object the improving of the structure between the slide and the tie rods and providing a mold clamping device wherein the tie rods which receive the mold clamping reaction are also used as guides for the movable table to simplify the structure, whereby the locking of the locking member with respect to the tie rod can be easily and properly accomplished by simple means regardless of the mold thickness and stable and highly reliable mold clamping can be rapidly attained.

A feature of the present invention resides in the fact that tie rods for guiding the movement of a movable table are projected from a fixed table, with engaging grooves such as threads being formed on the outer peripheral surface of the portion of each tie rod projecting from the movable table to the side opposite to the fixed table in a closed state of the mold, and a split mold-like locking member capable of engaging with and disengaging from the tie rod is slidably mounted on the tie rod in the axial direction of the tie rod through the engaging grooves in the closed state of operation of the mold, and a mold clamping cylinder is disposed between the locking member and the movable table.

Another feature of the present invention resides in the fact that a slide which supports a movable mold is advanced and retracted for mold opening and closing with respect to a base which supports a fixed mold through a plurality of tie rods and mold opening/closing cylinders, each of which are fixed to the base, and mold clamping is performed through mold clamping cylinders in a closed state of operation of the mold, the mold clamping cylinders each being disposed between a locking member and the slide, the locking member being slidably mounted on the tie rod engageable with and disengageable from an engaging portion formed on the outer peripheral surface of the tie rod, and two axial, symmetrical surfaces are formed as guide surfaces on the outer periphery of the tie rod, while guide shoes, at least one of which is tapered, are provided in the tie rod sliding bore of the slide in opposed relation to the guide surfaces.

A further feature of the present invention resides in the fact that the locking members mounted on the tie rods are supported on a common lock plate, the lock plate being positioned face to face with the mold clamping cylinders, and adjustable positioning means are provided for holding the lock plate in a predetermined position.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

The embodiments of the present invention will be described hereinafter with reference to the accompanying drawings, which description will refer to a vertical injection molding machine, but it is to be understood that the invention is applicable also to a horizontal injection molding machine.

FIGS. 1 through 4 show an embodiment of the present invention, in which the reference numeral 1 denotes a fixed table; 2 denotes a fixed mold attached to the fixed table 1; 3 denotes a movable table; and 4 denotes a movable mold attached to the movable table 3. From the fixed table 1 are projected a plurality (usually four, only two shown) of the rods 5 extending through the movable table 3, thereby permitting the movable table 2 to be moved up and down, that is, permitting the table 3 to be guided in directions approaching and moving away from the fixed table 1. Numeral 6 denotes a bushing fitted in the portion of the movable table 3 through which there extends the tie rod; 7 denotes a bushing holder; 8 denotes a support plate for supporting the upper ends of the tie rods; and 9 denotes a cylinder for opening and closing the molds 2 and 4 by moving the movable table 3 vertically along the tie rods 5 in the manner described above, the cylinder 9 spanning the fixed table 1 and the movable table 3.

Figure 1:
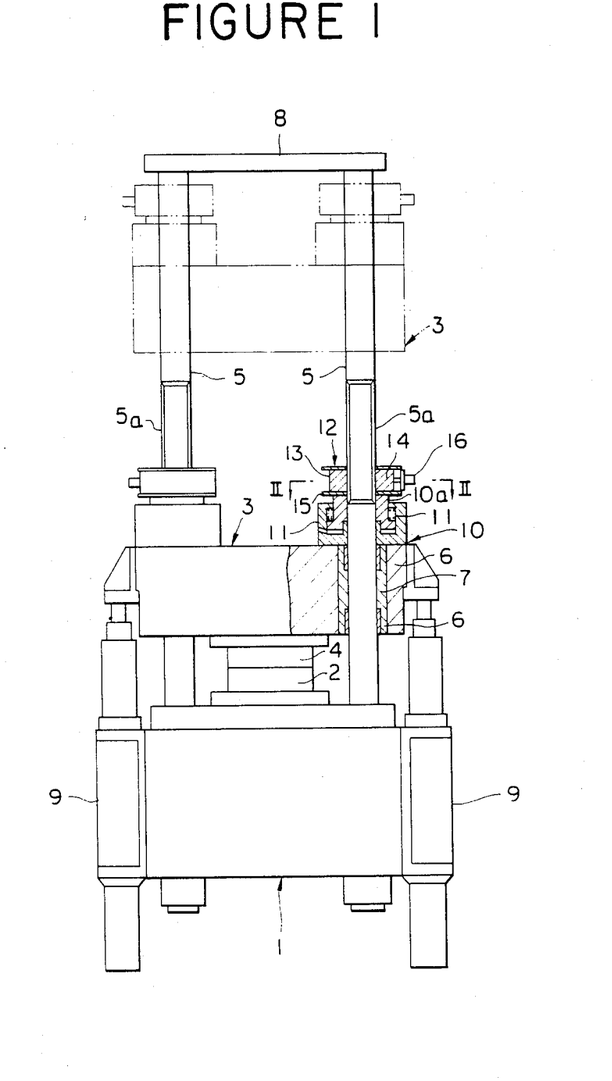
FIG. 1 is partially sectional side view in a closed state of mold, showing an embodiment of the present invention.
Figure 2:
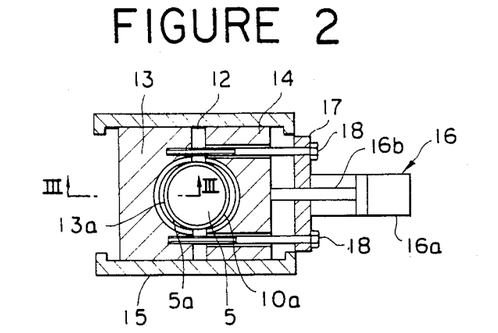
FIG. 2 is an enlarged sectional view taken on line II—II of FIG. 1.
Figure 3:
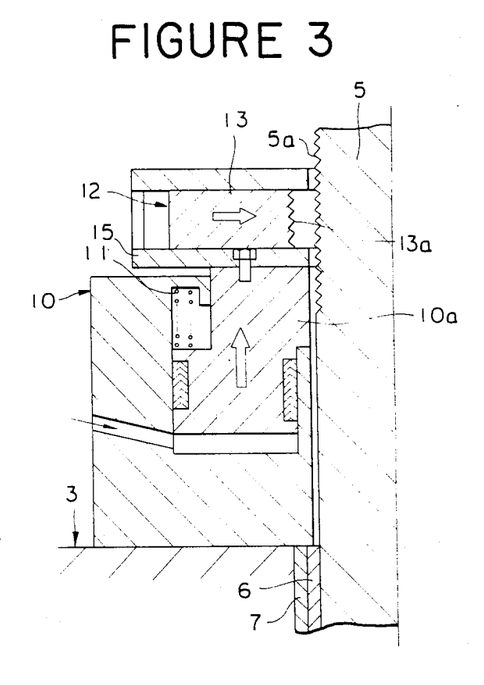
FIG. 3 is an enlarged sectional view taken on line III—III of FIG. 2.
Figure 4:
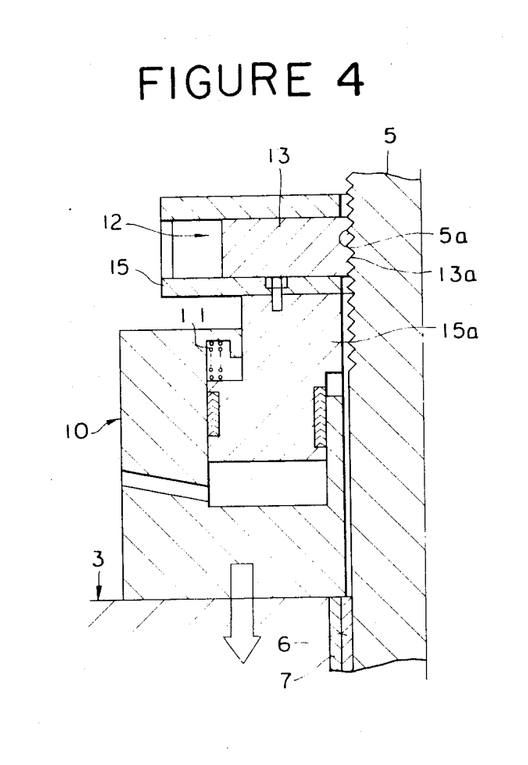
FIG. 4 is a view corresponding to FIG. 3 in a mold clamping state.

Further, numeral 10 denotes a single-acting, mold clamping cylinder mounted on the tie rod 5 and on the upper surface of the movable table 3 so as to be movable integrally with the table 3. Numeral 11 denotes a compression coiled spring for return of the mold clamping cylinder 10. Numeral 12 denotes a lock nut as a locking member, which is formed in the shape of a split mold in two halves comprising a pair of joinable and separable nut pieces 13 and 14 respectively having internal threads 13a and 14a formed on the inner surface thereof. The lock nut 12 is fitted around the outer periphery of the tie rod 5 so as to be positioned on a bracket 15 which is fixed to the upper surface of a piston 10a of the mold clamping cylinder 10. On the other hand, the tie rod 5 is provided with external threads 5a formed on the outer peripheral surface of its intermediate portion projecting upward from the movable table 3 in a closed state of operation of the mold as shown in FIG. 1. If the nut pieces 13 and 14 of the lock nut 12 are joined in a closed state operation of the mold, the lock nut 12 and the tie rod 5 engage each other through the respective threads 13a, 14a and 5a, thus providing an axially integrated state. On the other hand, if the nut pieces 13 and 14 are disconnected in an open state of the lock nut, the lock nut 12 moves vertically along the tie rod 5 together with the mold clamping cylinder 10 and the movable table 3. Numeral 16 denotes a cylinder for opening and closing the lock nut 12, with its cylinder tube 16a being fixed to one nut piece 13 through a plate 17 and a bolt 18 and with its piston rod 16b being fixed to the other nut piece 14. If in this state the piston rod 16b is extended, both nut pieces 13 and 14 move simultaneously in a direction approaching each other to close the lock nut 12, while if the piston rod 16b is withdrawn, both nut pieces 13 and 14 move in directions moving away from each other to open the lock nut 12.

In the above-described construction, the movable table 3 is moved downward from the open position of the mold shown in phantom in FIG. 1 by means of the opening/closing cylinder 9 to close the molds 2 and 4 as shown in solid line, and in this state oil under pressure is fed to the mold clamping cylinder 10. At the same time, or prior to the oil supply to the mold clamping cylinder 10, the pressure oil is also fed to the extension side of the lock nut operating cylinder 16. As a result, the piston 10a of the mold clamping cylinder 10 rises, the lock nut 12 closes, and the nut 12 and the tie rod 5 engage each other upon engagement of the respective threads 13a, 14a and 5a, thus providing an axially integrated state, so that the mold clamping reaction induced by the extension of the mold clamping cylinder 10 is received by the tie rod 5 through the lock nut 12 and the molds 2 and 4 are clamped under a strong force.

In this state, the mold interior is pressurized and molding is performed. Then, when opening the molds 2 and 4 after reducing pressure, the oil under pressure is discharged from the mold clamping cylinder 10 and at the same time the lock nut operating cylinder 16 is operated to the retracting side. As a result, the piston 10a of the mold clamping cylinder 10 moves down to release the mold clamping force, and at the same time the lock nut 12 opens and disengages from the tie rod 5. In this state, therefore, if the movable table 3 is moved upward by means of the cylinder 9, the mold clamping cylinder 10 and the lock nut 12 move upward together with the movable table 3 while being guided by the tie rod 5 and are returned to the respective positions shown in phantom in FIG. 1.

In the above embodiment, the external threads 5a are formed as the engaging groove of the tie rod 5, and the lock nut 12 as a locking member is engaged with and disengaged from the rod 5 through the external threads 5a. Alternatively, there may be formed a plurality of circumferential grooves in the axial direction as the engaging groove of the tie rod 5, and a split mold-like locking member having projections in opposed relation to the circumferential grooves may be brought into engagement with and disengaged from the tie rod 5. Moreover, the locking member may be constituted of three or more split pieces without being limited to two halves. Further, as to the operating mechanism for opening and closing the locking member, various modifications may be made other than the one described above.

Figure 5A:
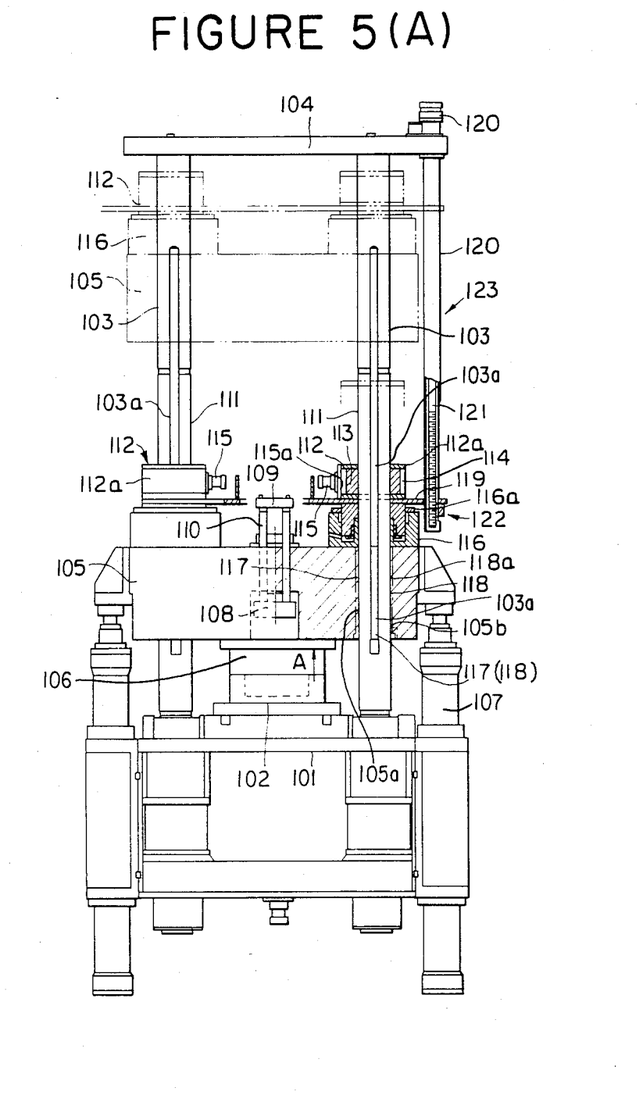
FIG. 5(A) is a longitudinally sectional front view of a principal portion of a mold clamping device according to another embodiment of the present invention.
Figure 5B:
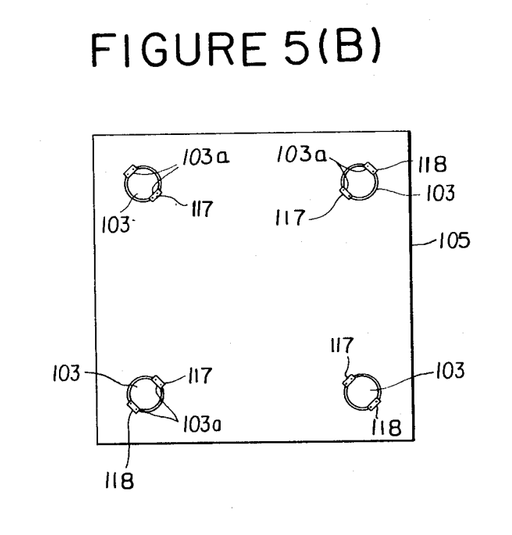
FIG. 5(B) is a plan view as viewed from arrow A in FIG. 5(A)

Referring now to FIGS. 5(A), 5(B), 6(A) and 6(B), there is shown another embodiment of the present invention. As shown in FIGS. 5(A) and 5(B), between tie rods 103 and a slide 105, a pair of flat, linear, guide surfaces 103a are concavely formed on two symmetrical surfaces in the axial direction at the outer periphery of each tie rod 103, while a pair of guide shoes 117 and 118 are disposed in part of a sliding bore 103a of the slide opposed to the guide surfaces 103a. The inner surfaces of the guide shoes 117 and 118 are flat, linear surfaces adapted to slidably contact the guide surfaces 103a. The outer surface of one guide shoe 117 (shown in dotted line at left in FIG. 5(A)) is a curved surface to conform to the inner surface of the sliding bore 105a, or a linear surface parallel to the flat inner surface, while the outer surface of the other guide shoe 118 (shown in dotted line at right in FIG. 5(A)) is formed as a tapered surface 118a matching a tapered surface 105b formed on the inner surface of the sliding bore 105a. The guide shoes have flanged lower ends through which they are removably secured to the slide 105 with bolts or the like.

Figure 6A:
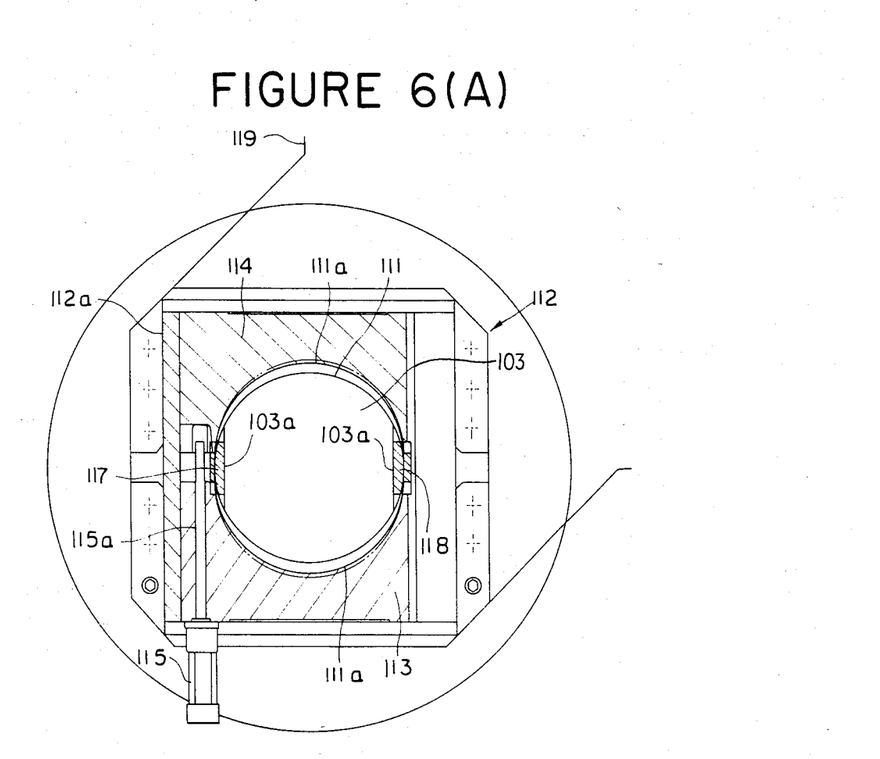
FIG. 6(A) is a transversely sectional plan view of a principal portion of a locking member.
Figure 6B:
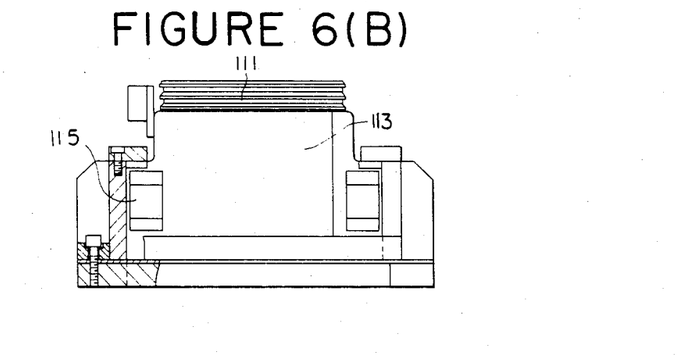
FIG. 6(B) is a side view thereof.
Figure 7:
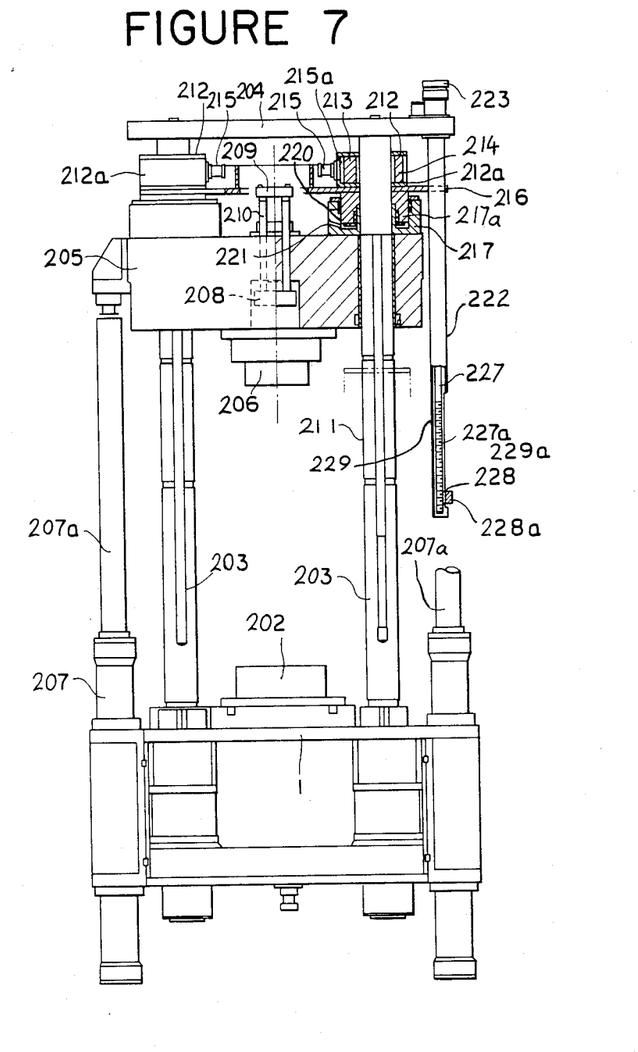
FIG. 7 is a longitudinally sectional front view of a principal portion of a mold clamping device in a starting position according to a further embodiment of the present invention.
Figure 8:
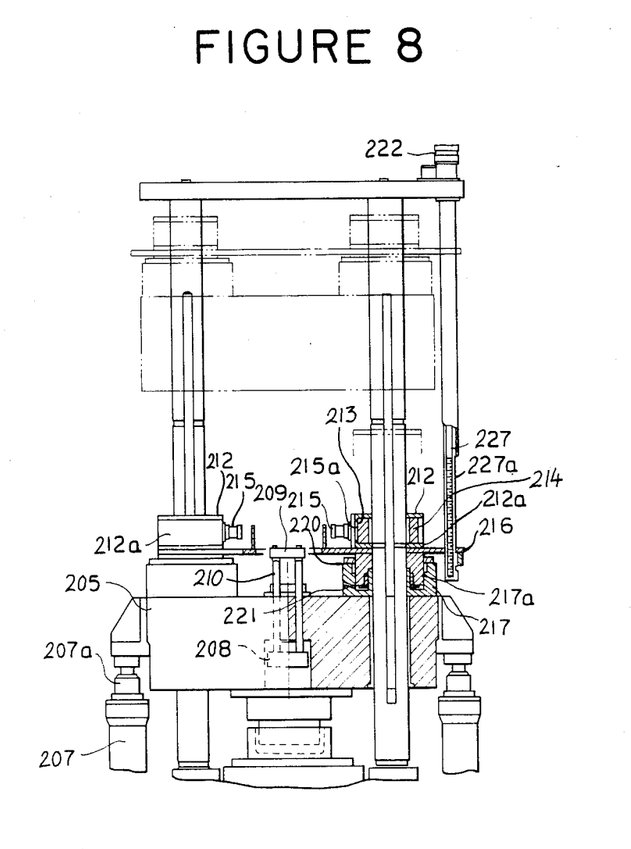
FIG. 8 is a longitudinally sectional front view of a principal portion thereof just before close contact of mold.
Figure 9:
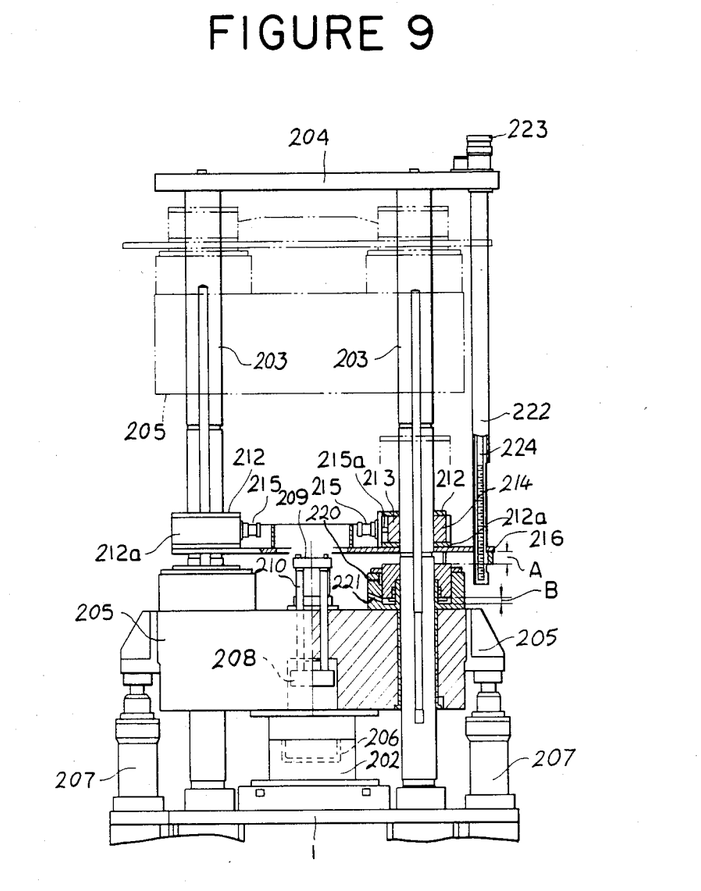
FIG. 9 is a longitudinally sectional front view of a principal portion thereof in a closely contacted state of mold.
Figure 10:
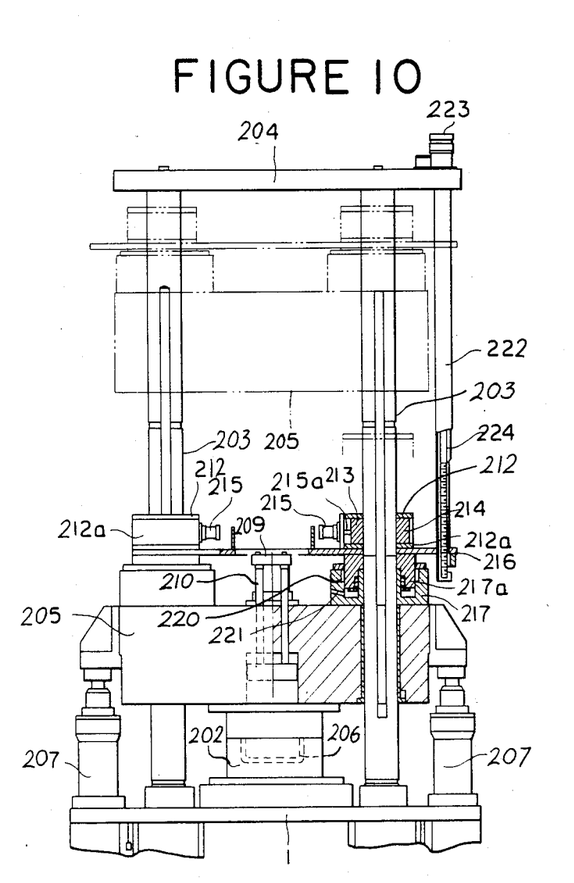
FIG. 10 is a longitudinally sectional front view of a principal portion thereof in a pressurized state for mold clamping.

If the slide 105 is moved on the tie rods 103 through contact with the guide surfaces 103a of each tie rod 103 along the guide shoes 117 and 118, it can be moved smoothly and certainly without causing knocking when passing the engaging portion 111 of the tie rod 103 while being guided by the guide surfaces 103a and guide shoes 117 and 118 as shown in solid line in FIG. 5(A). Besides, the guide shoes 117 and 118 may be short shoes matching the length of the sliding bore 105a. Further, one guide shoe 118 is tapered, so when the guide shoes 117 and 118 are worn, alignment can be effected easily by moving the guide shoe 118 within the sliding bore 105a. Also as to the lower portion of the tie rod 103 exposed above the base 101, there exists neither a bushing nor a bushing holder unlike in the prior art, so the space required for such portion is equal to only the size corresponding to a bare diameter of the tie rod 103; in other words, the inside dimension L of the tie rod can be enlarged, thereby permitting easy handling of tools, products, etc. FIGS. 6(A) and 6(B) illustrate the structural relationship between the tie rod 103 and the slide 105 at the portion where a locking member 112 is installed, as well as the structural relation between divided lock pieces 113 and 114 of the locking member 112 and the engaging portion 111 of the tie rod 105.

In the mold clamping device of the invention shown in FIG. 5, the locking members 112 on the tie rods 103 are mounted on the upper surface of a common lock plate 119 which is slidably fitted around the tie rods 103, and connected to the lower surface of the lock plate 119 are piston rods 116a of mold clamping cylinders 116. According to this construction, the lock members 112 can be controlled accurately in their locking position relative to the tie rods 103 by positioning of the common lock plate 119. More specifically, on a support plate 104 is mounted a positioning unit 123 which comprises a drive motor 120, a driving shaft 121 adapted to be rotated in forward and reverse directions by the motor 120, and a positioning stopper 122 capable of being moved up and down through the forward and reverse rotation of the shaft 121, the stopper 122 being mounted on the shaft 121. The lock plate 119 is held in position by the stopper 122 which has been set at a predetermined position, thereby permitting each locking member 112 to be driven, that is, permitting automatic engagement and locking of the locking member 112 with respect to the tie rod 103 before closing of both molds 102 and 106.

Figure 11:
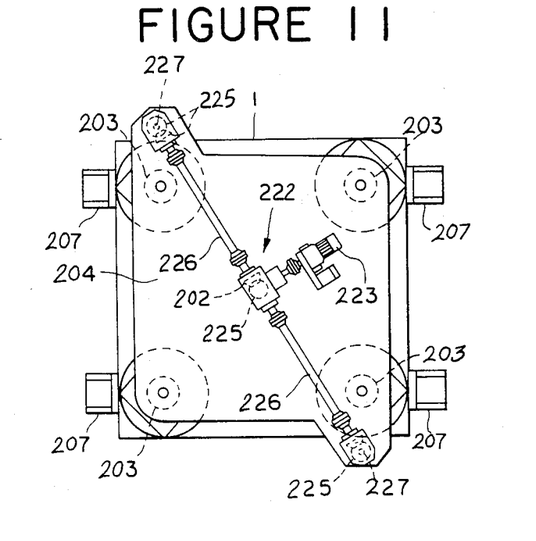
FIG. 11 is a plan view of an embodiment of a positioning means.
Figure 12:
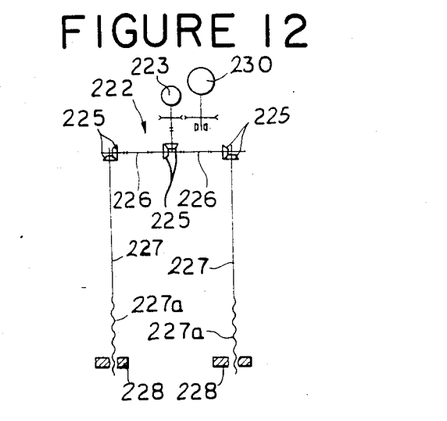
FIG. 12 is a view illustrative of a driving structure for the positioning means.

Referring now to FIGS. 7 through 15, there is shown a further embodiment of the present invention, in which locking members 212 are each slidably and lockably mounted on a tie rod 203 and their casing 212a are fixed onto the upper surface of a common lock plate 216 and are thereby supported. Between the lower surface of the lock plate 216 which supports the locking members 212 in common and the upper surface of a slide 205 are disposed mold clamping cylinders 217 in positions opposed to the locking members 212. The body side of the cylinder 217 is fixed onto the upper surface of the slide 205, while a piston rod 217a of the cylinder 217 is connected to the lock plate 216. In this case, the piston rod 217a may be connected directly to the lock plate 216, or alternatively, as shown in FIG. 215, the piston rod 217a may be connected to the plate 216 through a check bolt 218 and a spring 219 which are implanted in the upper surface of the piston rod 217a. Both cases are effective to the same degree. The mold clamping cylinder 217, which is of a single-acting type and through which there centrally extends the tie rod 203 as shown, is provided with a return packing 220 and a port 221. In the present invention, moreover, as positioning means for the lock plate 216, there is provided positioning means 222 as illustrated in FIGS. 7, 11, 12 and 14. In the positioning means shown as an example in FIG. 11, positioning is effected through two diagonally positioned tie rods 203. The positioning means 222 is mounted by utilization of a support plate 204. More specifically, as shown in FIGS. 11 and 12, a drive motor 223 is mounted on the support plate 204 and horizontal driving shafts 226 are connected to the motor 223 through a transmission member such as a bevel gear 225; further, a pair of vertical driving shafts 227 are suspended from the horizontal driving shafts 226 and are rotatable in forward and reverse directions, with screw threads 227a being formed at the lower portion of each vertical driving shaft 227, and a stopper 228 (comprising a screw nut) is fitted around the screw threads 227a vertically movable through a projection 228a engaging an elongated guide hole 229a of a guide sleeve 229 which encloses the vertical shaft 227, whereby the stopper 228 is moved up and down to a desired position through the forward and reverse rotation of the vertical driving shaft 227, and the lock plate 216 is supported by the stopper 228.

Figure 13:
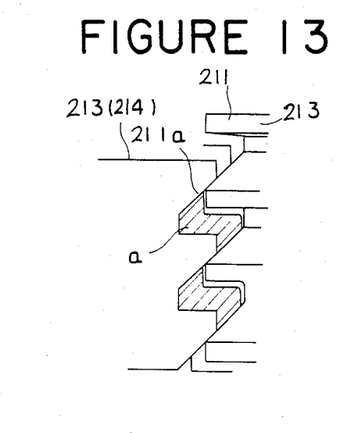
FIG. 13 is a view illustrative of engagement in an example of a locking structure.
Figure 14:
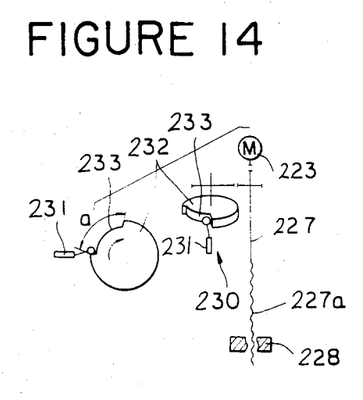
FIG. 14 is an explanatory view of a principal portion of a rotary cam switch.
Figure 15:
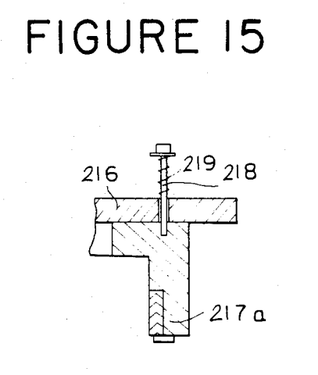
FIG. 15 is a sectional side view of a principal portion of an example of a structure for interconnection a lock plate and a mold clamping piston rod.

Numeral 230 denotes a rotary cam switch which, in case an engaging surface 211a of an engaging portion 211 is a groove-like toothed surface or the like as shown in FIG. 13, checks whether the state of engagement of the engaging surface 211a is safe or not, and when it is safe and secure, turns a switch 231 off, and when it is not safe or secure, turns the switch 231 on. The rotary cam switch 230 is interposed between the drive motor 223 and the horizontal driving shaft 226 as shown in FIG. 12, and a notch 233 which corresponds to a safety area is formed on the peripheral surface of a cam 232 as shown in FIG. 14, the operation of which will be described later. In the positioning means 222 shown in FIGS. 11, 12 and 14, the lock plate 216 is positioned through two diagonally positioned tie rods 203. Alternatively, such positioning may be accomplished through a single tie rod 3, and in this case the same positioning effect can be attained merely by connecting the motor 223 and the rotary cam switch 230 to the vertical driving shaft 227 as shown in FIG. 14.

According to the mold clamping device of this embodiment, the positioning operation through the positioning means 222 for the lock plate 216 as well as the mold clamping operation are performed in the following manner.

When new molds 202 and 206 are mounted, respectively, to the base 201 and the slide 205, the locking position is decided in the following manner. First, the drive motor 223 of the positioning means 222 is driven to rotate the vertical driving shaft 227 thereby allowing the stopper 228 to move downward to its lowest position. Then, the slide 205 is brought down by operation of the mold opening/closing cylinder 207 to bring the movable mold 206 into close contact with the fixed mold 202, and thereafter the drive motor 223 of the positioning means 222 is driven to rotate the vertical driving shaft 227 in the reverse direction thereby raising the stopper 228 which has been held in the lowest position (although the motor 223 is here used, this operation may be done manually). The raised stopper 228 comes into contact with the lower surface of the lock plate 216 which has been lowered due to the descent of the slide 205. After detecting this contact by means of a torque limiter or a load cell or the like of known structure (not shown), it can be determined whether or not the contacted position is in the safety locking area corresponding to a safe and sure engagement between the locking member 212 and the engaging portion 211 of the tie rod 203 is checked by operation of the rotary cam switch 230. More particularly, in FIG. 13, if the engaging portion 211 and the semi-circular engaging surface 211a of lock piece 213(214) are in a state of engagement within the range indicated with oblique lines, this corresponds to the safety locking area (a). Upon confirming of the safety area (a), the notch 233 of the cam 232 in the rotary switch 230 which notch corresponds to the safety area (a) arrives at the position of the switch 231, so that the motion of the vertical shaft 227 is discontinued and the initial set of the stopper 228 is completed. On the other hand, if the engagement is not within the safety area (a), such a state of engagement corresponds to a dangerous locking area, so the piston rod 217a of the mold clamping cylinder 217 rises, and because of the resultant decrease in load of the torque limiter or the load cell or the like, the stopper 228 rises again, so that, on the rotary cam switch 230 side, when the switch 231 arrives at the notch 233 which corresponds to the safety locking area (a), the piston rod 217a and the positioning means 222 stop operation immediately and thus the initial set is over. In this way, the initial locking position is decided when using new molds 202 and 206.

In the present invention, as set forth hereinabove, since the tie rods which receive the mold clamping reaction are so constructed as to be employable also as guide members for guiding the movement of the movable table, it is possible to attain a structural simplification and reduction with respect size and an advantage is obtained also in to maintenance, as compared with the conventional construction wherein the mold clamping reacting receiving member and the movement guide member are separately provided.

According to the mold clamping device of the present invention, moreover, by virtue of both the locking members which are disengageable and engageable with the tie rods and the mold clamping cylinders which are disposed between the locking members and the slide, a strong mold clamping force is easily assuredly obtainable by utilization of the tie rods. Further, a long and large guide bushing mechanism in the slide which has heretofore been considered essential is no longer required, and by using a pair of guide shoes at least one of which is tapered, not only the structure of the slide can be greatly simplified but it is also made possible to effect alignment.

Furthermore, in the mold clamping device of the invention, as previously described, the locking members for generating a mold clamping force through the tie rods are mounted on a common lock plate and separated from the slide, which lock plate is set in its locking position appropriately by a separately provided, adjustable positioning means. Consequently, a proper locking position of the locking members can be decided automatically and mechanically, and its reproducibility and reliability are extremely improved. In addition, since the locking operation is terminated during a slow descent before close contact of molds, the locking operation can be done without wasting time, unlike in the prior art devices, it is possible to shorten the cycle time and also possible to lock the plurality of locking members simultaneously and correctly as well as positively and easily. Moreover, regardless of the mold size (thickness), the lock plate is stopped in an appropriate position by the positioning means, that is, the thickness of the mold used may be of an optional value (within the range of values specified). Thus, there is provided a more effective mold clamping device easier to operate than in the conventional mold clamping devices.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mold clamping device for an injection molding machine wherein a movable table which supports a movable mold is moved in directions approaching and moving away from a fixed table which supports a fixed mold to thereby bring the molds into open and closed states; comprising:

a plurality of mold clamping cylinders, each mold clamping cylinder having a cylinder and piston means positioned in said cylinder, wherein mold clamping is effected in a closed state of the mold clamping cylinder;

a plurality of tie rods for guiding movement of said movable table, said tie rods projecting upwards from and being immovably fixed with respect to said fixed table and each having an engaging groove formed on an outer peripheral surface of a portion thereof projecting from said movable table to a side opposite said fixed table in said closed state of the molds;

a plurality of mold opening/closing cylinders fixed to said base; and a plurality of split mold-like locking members provided on said piston of said mold clamping cylinders for engaging with and disengaging from said tie rods through each said engaging groove, respectively, of said plurality of tie rods in said closed state of the molds, said locking members being slidable in an axial direction of said tie rods, wherein said piston means of said mold clamping cylinders further comprise means for moving said locking member axially along said tie rods with respect to said movable table and said mold clamping cylinders being disposed between said locking members and said movable table.

2. A mold clamping device for an injection molding machine comprising:
   a movable mold;
   a fixed mold;
   a base upon which said fixed mold is supported;
   a plurality of tie rods immovably fixed with said base and each including a sliding bore formed therein;
   a plurality of mold opening/closing cylinders fixed to said base;
   a slide supporting said movable mold so as to advance and retract said movable mold with respect to said base through said plurality of tie rods and said mold opening/closing cylinders to thereby bring the molds into open and closed states;
   a plurality of mold clamping cylinders, each mold clamping cylinder having a cylinder and a piston rod positioned in said cylinder, for effectively providing mold clamping in a closed state of the mold, said tie rods each having an engaging portion formed on the outer peripheral surface thereof; and
   a plurality of locking members wherein said mold clamping cylinders are disposed between said locking members and said slide, said locking members being provided on said piston rod of said mold clamping cylinder and slidably mounted on said tie rods so as to be disengageable and engageable with each said engaging portion of said tie rods, wherein said tie rods each further comprise first and second axial, symmetrical, guide surfaces formed on the outer peripheral surface thereof, and wherein said slide further comprises a plurality of guide shoes, each said guide shoe being positioned in each said tie rod sliding bore opposed to said guide surfaces, respectively, and at least one of said bores being tapered.

3. A mold clamping device for an injection molding machine according to claim 2, further comprising a common locking plate for supporting said locking members, said locking plate being disposed face to face with said mold clamping cylinders and further comprising adjustable positioning means for holding said locking plate in a predetermined position.

4. A mold clamping device as set forth in claim 1, further comprising biasing means positioned between said cylinder and said piston of each of said mold clamping cylinders.

5. A mold clamping device as set forth in claim 2, further comprising biasing means positioned between said cylinder and said piston of each of said mold clamping cylinders.

6. A mold clamping device as set forth in claim 4, wherein said biasing means further comprises compression coiled spring means.

7. A mold clamping device as set forth in claim 5, wherein said biasing means further comprises compression coiled spring means.

* * * * *